United States Patent
Jung et al.

(10) Patent No.: US 11,083,321 B2
(45) Date of Patent: Aug. 10, 2021

(54) COOKING APPLIANCE AND METHOD FOR CONTROLLING THE SAME

(71) Applicant: LG Electronics Inc., Seoul (KR)

(72) Inventors: Yoojin Jung, Seoul (KR); Hoonseob Sim, Seoul (KR); Jaekyung Yang, Seoul (KR); Yongsoo Lee, Seoul (KR); Hakjoo Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 16/269,170

(22) Filed: Feb. 6, 2019

(65) Prior Publication Data

US 2019/0307281 A1 Oct. 10, 2019

(30) Foreign Application Priority Data

Apr. 4, 2018 (KR) .......................... 10-2018-0039202

(51) Int. Cl.
- *A47J 27/04* (2006.01)
- *A47J 36/24* (2006.01)
- *A47J 36/32* (2006.01)
- *F24C 15/32* (2006.01)
- *F24C 7/08* (2006.01)

(52) U.S. Cl.
CPC ........... *A47J 27/04* (2013.01); *A47J 36/2405* (2013.01); *A47J 36/32* (2013.01); *F24C 7/087* (2013.01); *F24C 15/327* (2013.01); *A47J 2027/043* (2013.01)

(58) Field of Classification Search
CPC ....................................................... A47J 27/04
USPC ............................................ 126/20; 219/494
See application file for complete search history.

(56) References Cited

U.S. PATENT DOCUMENTS

| | | | | |
|---|---|---|---|---|
| 6,833,032 | B1 * | 12/2004 | Douglas | A21B 3/04 122/379 |
| 7,304,271 | B2 * | 12/2007 | Cho | F24C 15/327 126/20 |
| 8,207,477 | B2 | 6/2012 | Embury et al. | |
| 2005/0056634 | A1 * | 3/2005 | Shozo | F24C 14/005 219/401 |
| 2006/0011607 | A1 | 1/2006 | Cho et al. | |
| 2010/0064902 | A1 | 3/2010 | Sakane et al. | |

(Continued)

FOREIGN PATENT DOCUMENTS

EP 1617148 1/2006

OTHER PUBLICATIONS

Extended European Search Report in European Application No. 18215006.0, dated Jul. 9, 2019, 9 pages.

(Continued)

*Primary Examiner* — Avinash A Savani
(74) *Attorney, Agent, or Firm* — Fish & Richardson P.C.

(57) ABSTRACT

A cooking appliance includes a main body that defines a cooking chamber, a steam generator comprising a steam heater that is configured to heat food in the cooking chamber by generating steam, a lower heater located vertically below a bottom wall of the cooking chamber and configured to heat food in the cooking chamber, and a controller configured to control the steam heater and the lower heater. The controller is configured to: based on selection of a steam cooking mode, operate the steam heater to generate steam; and turn on the lower heater in a state in which steam cooking is performed.

20 Claims, 4 Drawing Sheets

(56) References Cited

U.S. PATENT DOCUMENTS

2010/0178395 A1* 7/2010 Embury .................... A23L 5/13
                                                    426/231
2017/0303348 A1* 10/2017 Kondo .................... F24C 7/085
2017/0343221 A1* 11/2017 Swayne ................ F24C 15/327
2018/0125282 A1    5/2018 Metz
2019/0059627 A1*  2/2019 Kitatani .............. A47J 37/1266

OTHER PUBLICATIONS

European Office Action in European Application No. 18215006.0, dated Jul. 7, 2020, 6 pages.

* cited by examiner

COOKING APPLIANCE AND METHOD FOR CONTROLLING THE SAME

CROSS-REFERENCE TO RELATED APPLICATION

This application is based on and claims the benefit of priority to Korean Patent Application No. 10-2018-0039202, filed on Apr. 4, 2018, in the Korean Intellectual Property Office, the disclosure of which is incorporated herein in its entirety by reference.

FIELD

The present disclosure relates to a cooking appliance and a method for controlling the same.

BACKGROUND

A cooking appliance is an appliance that can cook food using heat of a heating source. The cooking appliance may include a heating source for heating food contained in a cooking chamber.

In some cases, the cooking appliance may include a plurality of heating sources. The plurality of heating sources may include an electric heater, a magnetron, a steam generator, etc.

If the cooking appliance includes a steam generator, steam generated in the steam generator may be supplied to a cooking chamber to cook food.

In some cases, a heating cooker includes a main body having a cooking chamber formed therein, a steam generation heater installed in the cooking chamber, a water receiver installed in the cooking chamber such that a portion of the steam generation heater is submerged, and a water supply device for supplying water to the water receiver.

In some examples, after steam generation operation, water in the water receiver may be evaporated by residual heat of the steam generation heater, such that residual water does not remain in the water receiver.

In some cases, steam supplied into the cooking chamber may be condensed in the cooking chamber and drop to the bottom of the cooking chamber. In this case, the water (residual water) dropping to the bottom of the cooking chamber may be not evaporated by the residual heat of the steam generation heater.

In some cases where a heater is provided in the bottom of the cooking chamber, the heater may additionally operate after completion of cooking to evaporate residual water on the bottom of the cooking chamber. Alternatively, a user may remove the residual water on the bottom of the cooking chamber using a rag, for instance.

SUMMARY

The present disclosure provides a cooking appliance capable of changing water dropping to the bottom of a cooking chamber into steam used for cooking in a steam cooking process, and a method for controlling the same.

The present disclosure provides a cooking appliance capable of increasing an amount of steam used to cook food to enable rapid cooking, and a method for controlling the same.

The present disclosure provides a cooking appliance, in which residual water does not remain on the bottom of a cooking chamber after steam cooking is finished, and a method for controlling the same.

According to one aspect of the subject matter described in this application, a cooking appliance includes a main body that defines a cooking chamber, a steam generator including a steam heater that is configured to heat food in the cooking chamber by generating steam, a lower heater located vertically below a bottom wall of the cooking chamber and configured to heat food in the cooking chamber, and a controller configured to control the steam heater and the lower heater. The controller is configured to: based on selection of a steam cooking mode, operate the steam heater to generate steam; and turn on the lower heater in a state in which steam cooking is performed.

Implementations according to this aspect may include one or more of the following features. For example, the controller may be further configured to turn on the lower heater based on an elapse of a predetermined time after the steam cooking starts. In some examples, the controller may be further configured to simultaneously turn off the steam heater and the lower heater based upon determining that the steam cooking is finished. In some examples, the controller may be further configured to repeatedly turn on and off the lower heater until the steam cooking is finished.

In some implementations, the controller may be further configured to: turn off the lower heater before the steam cooking is finished; and turn off the steam heater based on determining that the steam cooking is finished. In some implementations, the cooking appliance may further include a water collection part recessed from the bottom wall of the cooking chamber and configured to collect water.

According to another aspect, a cooking appliance includes a main body that defines a cooking chamber, a steam supply port located at a sidewall of the cooking chamber, a water tank configured to store water, a steam generator including a steam heater configured to heat water stored in the water tank and to generate steam to supply to the cooking chamber, a water supply pump configured to supply water to the water tank, a lower heater located vertically below a bottom wall of the cooking chamber and configured to heat food in the cooking chamber, and a controller configured to control the steam heater and the lower heater. The controller is configured to: based on selection of a steam cooking mode, operate the water supply pump to supply water from the water tank to the cooking chamber through the steam supply port before operation of the steam heater; and operate the steam heater and the lower heater based on water being supplied to the cooking chamber through the steam supply port.

Implementations according to this aspect may include one or more of the following features. For example, the cooking appliance may further include a drainage pump configured to discharge water from the water tank, where the controller is further configured to operate the drainage pump to discharge a portion of water from the water tank after operation of the water supply pump and before operation of the steam heater. In some examples, the controller may be further configured to turn off the lower heater based on operation of the lower heater for a predetermined time after a start of steam cooking.

In some examples, the controller may be further configured to, after the lower heater is turned off after operation of the lower heater for the predetermined time, turn on and off the lower heater one or more times until the steam cooking is finished. In some implementations, the cooking appliance may further include a water collection part recessed from the bottom wall of the cooking chamber and configured to collect water.

According to another aspect, a method for controlling a cooking appliance includes: starting a steam cooking; operating a steam heater configured to generate steam; based on operation of the steam heater, supplying steam to a cooking chamber of the cooking appliance; determining whether a predetermined time has passed after the steam cooking started; and based on determining that the predetermined time has passed after the steam cooking started, turning on a lower heater of the cooking appliance, the lower heater being located vertically below a bottom wall of the cooking chamber.

Implementations according to this aspect may include one or more of the following features. For example, the method may further include: turning off the lower heater before the steam cooking is finished; and turning off the steam heater based on determining that the steam cooking is finished. In some implementations, the method may further include, after the lower heater is turned off, turning on and off the lower heater one or more times before the steam cooking is finished. In some implementations, the method may further include turning off the steam heater and the lower heater based on determining that the steam cooking is finished.

According to another aspect, provided is a method for controlling a cooking appliance that includes a water tank configured to store water, a steam generator including a steam heater configured to heat water stored in the water tank and configured to generate steam to be supplied to a cooking chamber of the cooking appliance, a water supply pump configured to supply water to the water tank, a lower heater located vertically below a bottom wall of the cooking chamber, and a steam supply port located at a sidewall of the cooking chamber and configured to supply steam from the water tank to the cooking chamber. The method includes: starting a steam cooking; operating the water supply pump; based on operation of the water supply pump, supplying water from the water tank to the cooking chamber through the steam supply port; after operation of the water supply pump, operating a drainage pump of the cooking appliance configured to discharge a portion of water from the water tank; and after stopping operation of the drainage pump, simultaneously or sequentially operating the steam heater and the lower heater.

Implementations according to this aspect may include one or more of the following features. For example, operating the steam heater and the lower heater includes: operating the lower heater for a predetermined time after starting the steam cooking; and stopping operation of the lower heater based on operation of the lower heater for the predetermined time. In some implementations, the method may further include, after stopping operation of the lower heater based on operation of the lower heater for the predetermined time, turning on and off the lower heater one or more times until the steam cooking is finished.

In some implementations, the method may further include at least one of: after stopping operation of the lower heater based on operation of the lower heater for the predetermined time, turning on and off the lower heater one or more times until the steam cooking is finished; or simultaneously turning off the lower heater and the steam heater based on the steam cooking being finished. In some examples, sequentially operating the steam heater and the lower heater includes operating the steam heater before operating the lower heater.

DETAILED DESCRIPTION

Figure 1:
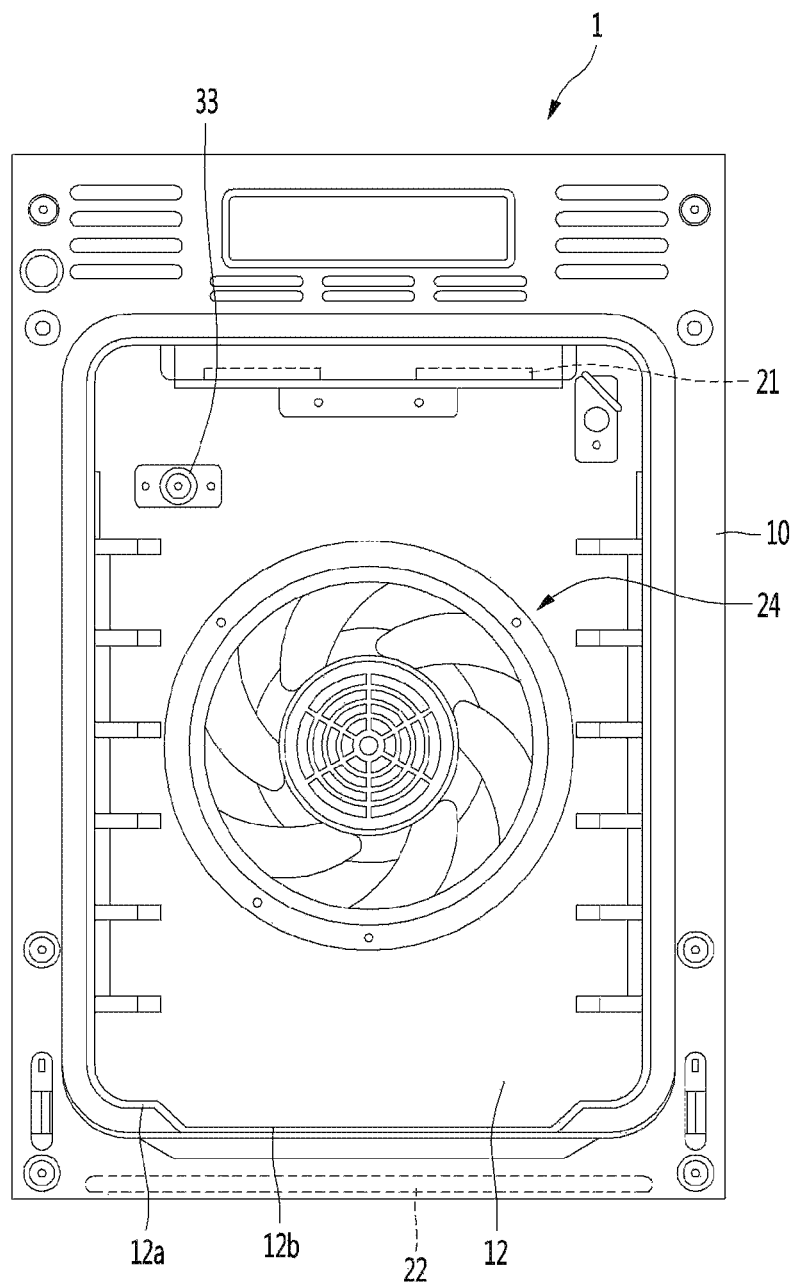
FIG. 1 is a view schematically showing an example cooking appliance.
Figure 2:
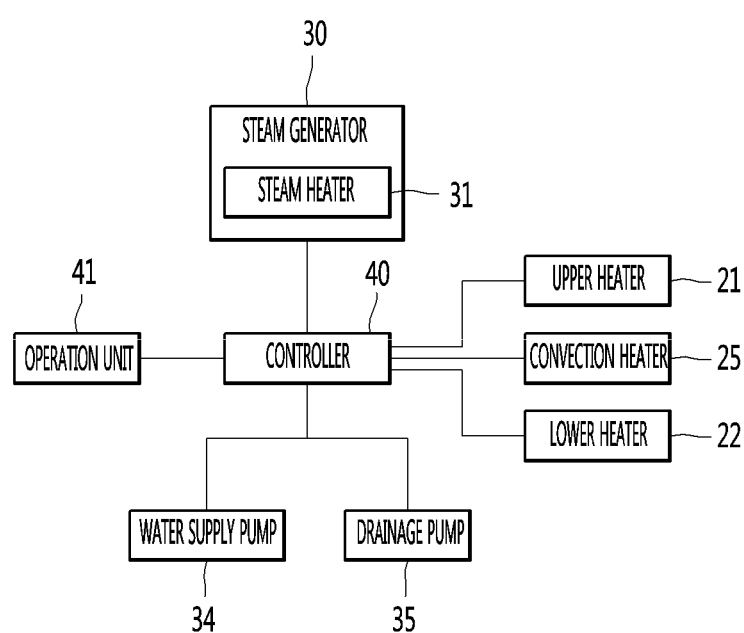
FIG. 2 is a block diagram showing an example cooking appliance.

FIG. 1 is a view schematically showing an example cooking appliance, and FIG. 2 is a block diagram showing an example cooking appliance.

Referring to FIGS. 1 and 2, the cooking appliance 1 may include a main body 10. The main body 10 may include a cooking chamber 12. In some implementations, the cooking appliance 1 may further include a door connected to the main body 10 and configured to open and close the cooking chamber 12.

The cooking appliance 1 may include a plurality of heating sources in order to cook food contained in the cooking chamber 12.

The plurality of heating sources may include different types of heating sources.

Although not limited, the plurality of heating sources may include, for example, an upper heater 21 and a lower heater 22.

The upper heater 21 may be located at the upper side in the cooking chamber 12 and may supply heat to the upper space of the cooking chamber 12. In some examples, the upper heater 21 may be located at the upper side of the cooking chamber 12 outside the cooking chamber 12. In this case, an opening, through which heat passes, may be defined in the upper wall of the cooking chamber 12. Alternatively, when the upper heater generates radiant energy, a transmission part may be provided in the upper wall of the cooking chamber 12.

The lower heater 22 may be located below the bottom wall 12a of the cooking chamber 12 outside the cooking chamber 12. The lower heater 22 may supply heat to the lower side of the food contained in the cooking chamber 12.

A water collection part 12b, in which water may be collected, may be provided in the bottom wall 12a of the cooking chamber 12. The water collection part 12b may be, for example, located at the bottom wall 12a in a downwardly recessed shape.

Water collected in the water collection part 12b may be heated by the lower heater 22, thereby being evaporated.

The upper heater 21 and the lower heater 22 may be, for example, electric heaters.

The plurality of heating sources may further include a convection heater 25 configuring a convection device 24. The convection device 24 may include a convection fan. By the convection fan, air in the cooking chamber 12 may flow to the convection heater, thereby being heated and then supplied to the cooking chamber 12.

The plurality of heating sources may further include a steam generator 30 for heating water to generate steam.

The steam generator 30 may include a water tank for storing water and a steam heater 31 for heating the water of the water tank.

When water is heated by the steam heater 31, the water may be changed into steam and the steam may be supplied into the cooking chamber 12 through a steam supply port 33 located at one sidewall of the cooking chamber 12.

The cooking appliance 1 may further include a water supply pump 34 for supplying water to the water tank and a drainage pump 35 for discharging the water of the water tank.

The water supply pump 34 may supply water to the water tank in the steam cooking process. In some examples, the water supply pump 34 may intermittently operate to intermittently supply water to the water tank.

The drainage pump 35 may operate to discharge residual water remaining in the water tank after the steam cooking process.

The cooking appliance 1 may further include an operation unit 41 for selecting a cooking mode or a type of each of the plurality of heating sources and a controller 40 for controlling the plurality of heating sources by a command received from the operation unit 41.

As described above, since different types of heating source are provided, the cooking appliance 1 may cook various types of food using various cooking modes.

In the present implementation, the cooking mode may include a steam cooking mode for cooking food using at least steam.

In the steam cooking mode, at least the steam heater 31 of the plurality of heating sources may operate.

Hereinafter, provided are example methods for controlling an example cooking appliance.

Figure 3:
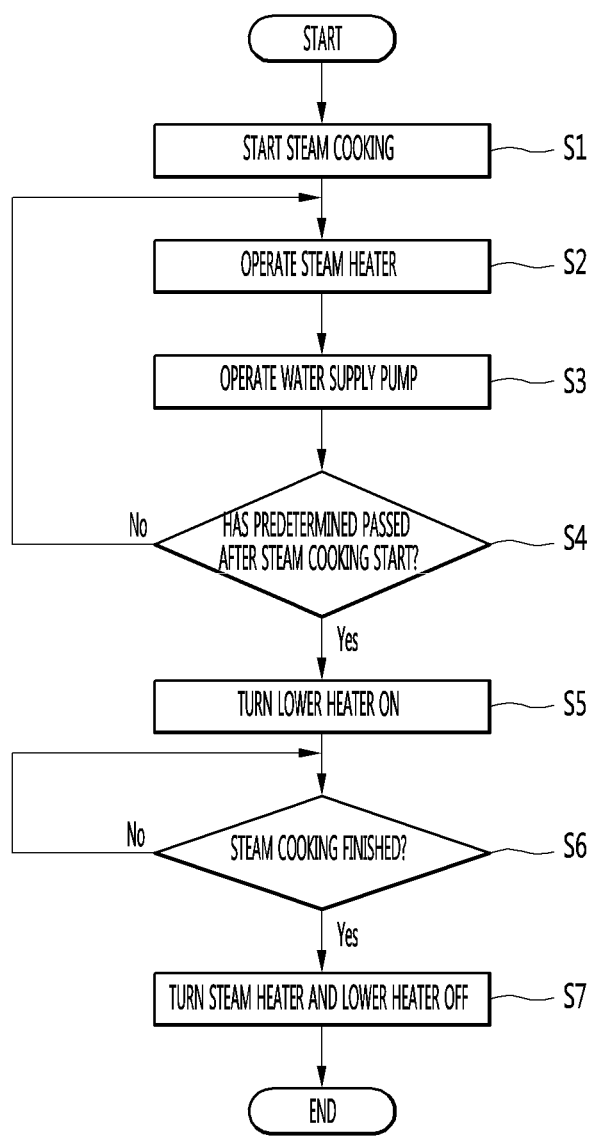
FIG. 3 is a flowchart illustrating an example method of controlling an example cooking appliance.

FIG. 3 is a flowchart illustrating an example method of controlling an example cooking appliance.

Referring to FIGS. 2 and 3, when the steam cooking mode is selected, steam cooking may start (S1).

For steam cooking, the controller 40 operates the steam heater 31 (S2). Although water is not contained in the water tank, the steam heater 31 may first operate, for preheating in the water tank.

In addition, the controller 40 may operate the water supply pump 34 for supplying water to the water tank (S3).

In some implementations, the controller 40 may operate the drainage pump 35 for a predetermined time before operating the water supply pump 34, in order to remove water which may remain in the water tank.

When the water remains in the water tank for a long time, since scale is mixed with the water in the water tank, the drainage pump 35 may first operate in order to discharge the scale in the water tank together with residual water.

If water is heated in a state in which the scale remains, the scale may be supplied to the cooking chamber together with steam. In this case, the scale may be attached to food. However, this may be prevented by operating the drainage pump 35 before operating the water supply pump 34.

In some examples, the drainage pump 35 may first operate and then the steam heater 31 may operate.

As another example, when the steam cooking mode starts, the water supply pump 34 and the steam heater 31 may simultaneously operate.

In addition, the water supply pump 34 may first operate to start water supply and then the steam heater 31 may operate.

The amount of water supplied to the water tank by operation of the water supply pump 34 at the beginning of the steam cooking may be referred to as a first supply amount.

In some examples, the first supply amount may be set to a capacity less than a maximum capacity of the water tank.

When the steam heater 31 operates in a state of supplying water to the water tank, the water of the water tank may be heated and changed by heat of the steam heater 31 into steam, and the steam generated in the water tank may be supplied into the cooking chamber 12 through the steam supply port 33.

The steam heater 31 may be repeatedly turned on and off in the entire steam cooking process. That is, the steam heater 31 may intermittently operate by the controller 40.

In addition, the water supply pump 34 may also be repeatedly turned on and off in the entire steam cooking process. That is, the water supply pump 34 may intermittently operate by the controller 40.

The steam supplied into the cooking chamber 12 heats food. Some of the steam supplied to the cooking chamber 12 may be brought into contact with the food and then condensed, thereby flowing along the food downward.

The other of the steam supplied into the cooking chamber 12 may not be brought into contact with the food and may be condensed in the cooking chamber 12, thereby dropping to the bottom wall 12a of the cooking chamber 12.

As described above, since the recessed water collection part 12b is provided in the bottom wall 12a of the cooking chamber 12, the condensed water is collected in the water collection part 12b.

In some implementations, as the steam cooking time is increased, the amount of condensed water collected in the water collection part 12b may be increased.

In the present implementation, in order to use the condensed water collected in the water collection part 12b for cooking, the controller 40 may determine whether a predetermined time has passed after the steam cooking starts (S4).

Upon determining that the predetermined time has passed after the steam cooking starts in step S4, the controller 40 turns the lower heater 22 on (S5).

When the lower heater 22 is turned on, the water collected in the water collection part 12b is heated by heat generated by the lower heater 22, thereby generating steam.

Such steam may be used to heat the food.

That is, the food may be cooked by the steam generated in the steam generator 30 in the steam cooking process and the steam generated by heating the water collected in the water collection part 12b.

According to the present implementation, it may be possible to increase the amount of steam used to heat the food without increasing the capacity of the water tank of the steam generator 30 or the output of the steam heater 31.

In addition, if the amount of steam used to heat the food is increased, it is possible to reduce the cooking time of the food.

The controller 40 determines whether steam cooking is finished (S6), and turns the steam heater 31 and the upper heater 21 off when steam cooking is finished (S7).

When the water stored in the water collection part 12b is heated by the lower heater 22, residual water does not remain in the water collection part 12b after the steam cooking is finished.

According to the present implementation, it may be possible to prevent the heater from unnecessarily operating in order to remove the residual water of the water collection part 12b after the steam cooking is finished.

In addition, since it is not necessary for the user to clean the water collection part 12b in order to remove the residual water of the water collection part 12b after the steam cooking is finished, user's troublesomeness may be removed.

In the present implementation, since the amount of water collected in the water collection part 12b at the beginning of the steam cooking is small, the amount of steam generated by operating the lower heater 22 is small and thus the food may be excessively heated by heat of the lower heater 22.

Accordingly, in the present implementation, the lower heater 22 is turned on when the predetermined time has passed after the steam cooking starts.

Although the lower heater 22 is turned off after the steam cooking is finished in the above implementation, the lower heater 22 may be turned off before the steam cooking is finished.

In some implementations, when a difference between a time when the lower heater 22 is turned off and a time when the steam cooking is finished is small, even when some of the water remains in the water collection part 12b in a state of turning the lower heater 22 off before the steam cooking is finished, the residual water remaining in the water collection part 12b may be heated by residual heat of the lower heater 22, thereby being evaporated.

As another example, the lower heater 22 may intermittently operate until the steam cooking is finished. That is, the lower heater 22 may be repeatedly turned on/off.

Figure 4:
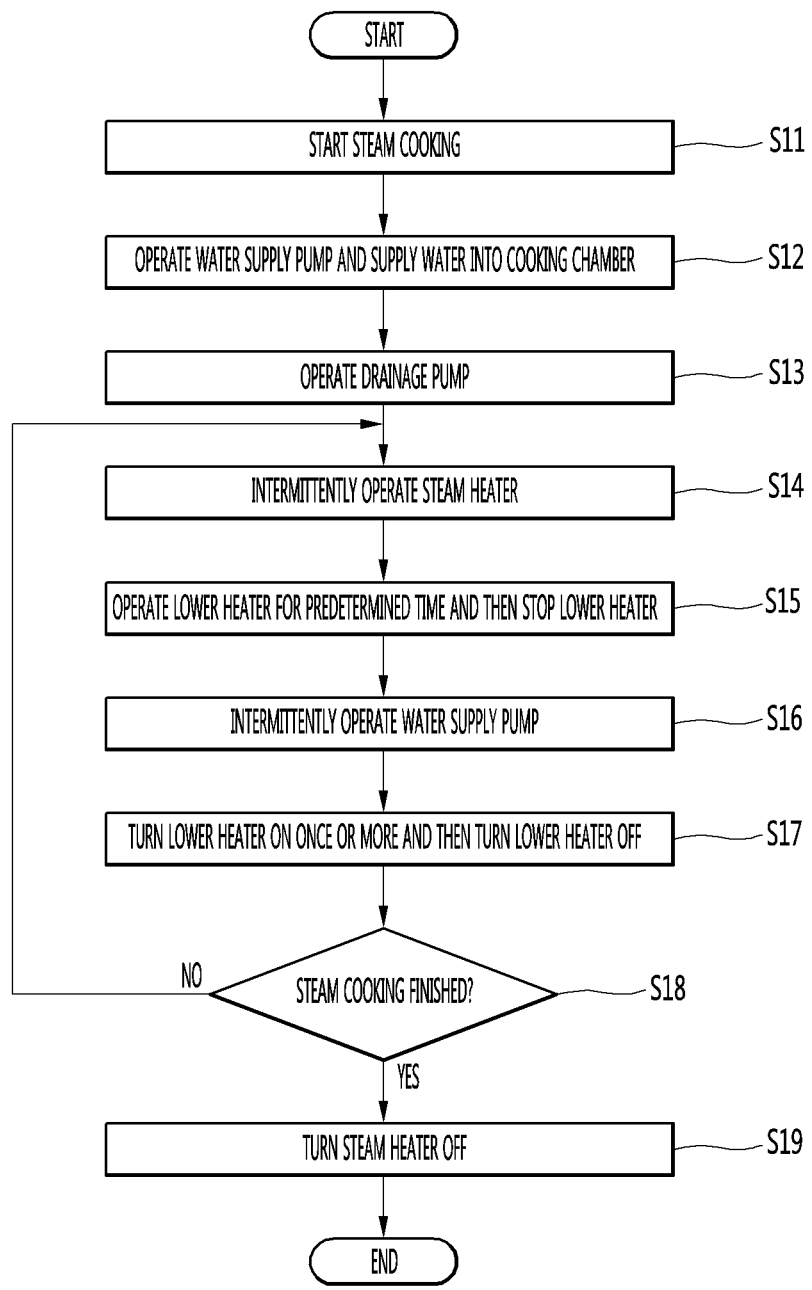
FIG. 4 is a flowchart illustrating an example method of controlling an example cooking appliance.

FIG. 4 is a flowchart illustrating an example method of controlling an example cooking appliance.

The present implementation is equal to the previous implementation in the configuration of the cooking appliance and is different therefrom in a method for generating additional steam by the lower heater. Accordingly, only the characteristics of the present implementation will be described.

Referring to FIG. 4, when the steam cooking mode is selected, steam cooking may start (S11).

The controller 40 may operate the water supply pump 34 such that water is supplied to the water collection part 12b before the steam heater 31 operates (S12).

The amount of water supplied to the water tank by the water supply pump 34 may be referred to as a second supply amount.

In the present implementation, the second supply amount may be greater than not only the first supply amount but also the maximum capacity of the water tank, such that the water passing through the water tank is supplied into the cooking chamber to be collected in the water collection part 12b.

In particular, the second supply amount may be set to a capacity higher than the maximum capacity of the water tank and the maximum capacity of a steam channel for connecting the water tank and the steam supply port 33.

Accordingly, the water supplied to the water tank may overflow from the water tank, thereby being supplied to the cooking chamber 12 through the steam supply port 33.

In the present implementation, since the water supplied to the water tank is supplied to the cooking chamber 12, even when scale is present in the water tank, the scale may be discharged from the water tank and moved to the bottom wall 12a of the cooking chamber 12 together with water.

In some implementations, since the scale is accumulated in the water collection part 12b of the cooking chamber 12, it is possible to prevent the scale from being moved to the food while the water of the water collection part 12b is heated.

When the scale is present in the water collection part 12b, the user can easily remove the scale present in the water collection part 12b after the cooking is finished.

After the water supply pump 34 operates such that the water is supplied by the second supply amount, the controller 40 stops the water supply pump 34 and operates the drainage pump 35 (S13).

In the present implementation, when operation of the water supply pump 34 is stopped, the water tank is filled with water and water remains in the channel for connecting the water tank and the steam supply port 33.

When the steam heater 31 operates in this state, a time required to generate steam is increased and water flows to the bottom wall 12a of the cooking chamber 12 while water is heated.

Accordingly, after operation of the water supply pump 34 is stopped, the drainage pump 35 may operate in order to discharge some of the water of the water tank.

Next, the controller 40 controls operation of the steam heater 31 such that the steam heater 31 intermittently operates (S14).

In addition, the controller 40 operates the lower heater 22 for a predetermined time such that the water of the water collection part 12b is heated to generate steam, and then turns the lower heater 22 off (S15).

In some implementations, the steam heater 31 and the lower heater 22 may simultaneously or sequentially start to operate.

In addition, the controller 40 controls the water supply pump 34 such that the water supply pump 34 intermittently operates (S16).

The lower heater 22 and the steam heater 31 may simultaneously operate in a period of the steam cooking process and only the steam heater 31 may operate in the other period.

As described above, in the steam cooking process, some of the steam generated by the steam generator 30 and supplied to the cooking chamber 12 may be condensed and collected in the water collection part 12b.

However, in the steam cooking process, the amount of water collected in the water collection part 12b is less than the amount of water supplied to the water collection part 12b at the beginning of the steam cooking.

Accordingly, the lower heater 22 operates to heat the water of the water collection part 12b, thereby generating steam. Then, the lower heater 22 is stopped after the predetermined time has passed, such that the operation time of the lower heater 22 is prevented from being increased in a state in which water does not remain in the water collection part 12b.

Even after the lower heater 22 is stopped, the condensed water may be collected in the water collection part 12b.

Accordingly, the controller 40 may control the lower heater 22 such that the lower heater 22 is turned on and off once or more until the steam cooking is finished after the lower heater 22 operates and stops once.

The controller 40 determines whether the steam cooking is finished (S18), and turns the steam heater 31 off when the steam cooking is finished (S19).

As another example, after the lower heater 22 operates and stops once, the lower heater 22 is turned on again and is turned off before the steam cooking is finished or is turned off together with the steam heater when the steam cooking is finished.

According to the present implementation, since the lower heater 22 operates in a state of supplying water to the water collection part 12b, the amount of steams used to heat the food in the steam cooking process can be further increased and thus the cooking time of the food can be reduced.

What is claimed is:

1. A cooking appliance comprising:
a main body that defines a cooking chamber;
a steam generator comprising a steam heater that is configured to heat food in the cooking chamber by generating steam;
a pump configured to deliver water to the steam generator;

a lower heater located vertically below a bottom wall of the cooking chamber and configured to heat food in the cooking chamber; and a controller configured to control the steam heater and the lower heater, wherein the controller is configured to:

based on a selection of a steam cooking mode, operate the steam heater to generate steam, and based on an elapse of a predetermined time after the steam cooking starts, turn on the lower heater in a state in which steam cookinq is performed.

2. The cooking appliance of claim 1, wherein the controller is further configured to simultaneously turn off the steam heater and the lower heater based upon determining that the steam cooking is finished.

3. The cooking appliance of claim 1, wherein the controller is further configured to repeatedly turn on and off the lower heater until the steam cooking is finished.

4. The cooking appliance of claim 1, wherein the controller is further configured to:

turn off the lower heater before the steam cooking is finished; and turn off the steam heater based on determining that the steam cooking is finished.

5. The cooking appliance of claim 1, further comprising a water collection part recessed from the bottom wall of the cooking chamber and configured to collect water.

6. A cooking appliance comprising:

a main body that defines a cooking chamber;

a steam supply port located at a sidewall of the cooking chamber;

a water tank configured to store water;

a steam generator comprising a steam heater configured to heat water stored in the water tank and to generate steam to supply to the cooking chamber;

a water supply pump configured to supply water to the water tank;

a lower heater located vertically below a bottom wall of the cooking chamber and configured to heat food in the cooking chamber; and a controller configured to control the steam heater and the lower heater, wherein the controller is configured to:

based on a selection of a steam cooking mode, operate the water supply pump to supply water from the water tank to the cooking chamber through the steam supply port before an operation of the steam heater, operate the steam heater and the lower heater based on water being supplied to the cooking chamber through the steam supply port, and turn off the lower heater based on an operation of the lower heater for a predetermined time after a start of steam cooking.

7. The cooking appliance of claim 6, further comprising a drainage pump configured to discharge water from the water tank, wherein the controller is further configured to operate the drainage pump to discharge a portion of water from the water tank after the operation of the water supply pump and before the operation of the steam heater.

8. The cooking appliance of claim 6, wherein the controller is further configured to, after the lower heater is turned off after an operation of the lower heater for the predetermined time, turn on and off the lower heater one or more times until the steam cooking is finished.

9. The cooking appliance of claim 6, further comprising a water collection part recessed from the bottom wall of the cooking chamber and configured to collect water.

10. A method for controlling a cooking appliance, comprising:

starting a steam cooking;

operating a steam heater configured to generate steam;

based on the operation of the steam heater, supplying steam with a water supply pump to a cooking chamber of the cooking appliance;

determining whether a predetermined time has passed after the steam cooking started; and based on determining that the predetermined time has passed after the steam cooking started, turning on a lower heater of the cooking appliance, the lower heater being located vertically below a bottom wall of the cooking chamber, wherein water collected in a water collection part is heated by the lower heater to generate steam.

11. The method of claim 10, further comprising:

turning off the lower heater before the steam cooking is finished; and turning off the steam heater based on determining that the steam cooking is finished.

12. The method of claim 11, further comprising:

after the lower heater is turned off, turning on and off the lower heater one or more times before the steam cooking is finished.

13. The method of claim 10, further comprising:

turning off the steam heater and the lower heater based on determining that the steam cooking is finished.

14. A method for controlling a cooking appliance that includes a water tank configured to store water, a steam generator including a steam heater configured to heat water stored in the water tank and configured to generate steam to be supplied to a cooking chamber of the cooking appliance, a water supply pump configured to supply water to the water tank, a lower heater located vertically below a bottom wall of the cooking chamber, and a steam supply port located at a sidewall of the cooking chamber and configured to supply steam from the water tank to the cooking chamber, the method comprising:

starting a steam cooking;

operating the water supply pump;

based on operation of the water supply pump, supplying water from the water tank to the cooking chamber through the steam supply port;

after operation of the water supply pump, operating a drainage pump of the cooking appliance configured to discharge a portion of water from the water tank; and after stopping operation of the drainage pump, simultaneously or sequentially operating the steam heater and the lower heater, wherein operating the steam heater and the lower heater comprises operating the lower heater for a predetermined time after starting the steam cooking, and stopping the operation of the lower heater based on the operation of the lower heater for the predetermined time.

15. The method of claim 14, further comprising:

after stopping the operation of the lower heater based on the operation of the lower heater for the predetermined time, turning on and off the lower heater one or more times until the steam cooking is finished.

16. The method of claim 14, further comprising at least one of:

after stopping the operation of the lower heater based on the operation of the lower heater for the predetermined time, turning on and off the lower heater one or more times until the steam cooking is finished; or simultaneously turning off the lower heater and the steam heater based on the steam cooking being finished.

17. The method of claim 14, wherein sequentially operating the steam heater and the lower heater comprises operating the steam heater before operating the lower heater.

18. The cooking appliance of claim 5, wherein the water collection part is located at the bottom wall in a downwardly recessed shape.

19. The cooking appliance of claim 5, wherein the water stored in the water collection part is heated by the lower heater to generate steam.

20. The cooking appliance of claim 9, wherein the water collection part is located at the bottom wall in a downwardly recessed shape.

* * * * *